United States Patent [19]

Müller

[11] 3,898,694

[45] Aug. 5, 1975

[54] TAPE RECORDING APPARATUS WITH SPEED CONTROL FOR A THREE PHASE HEAD DRIVE MOTOR

[75] Inventor: Rolf Müller, Seeheim, Germany

[73] Assignee: Robert Bosch Fernsehanlagen G.m.b.H., Darmstadt, Germany

[22] Filed: Oct. 17, 1973

[21] Appl. No.: 407,048

[52] U.S. Cl. ..................... 360/75; 360/70; 318/314

[51] Int. Cl.[2] ..................... G11B 21/02

[58] Field of Search ......... 360/70, 75; 318/314, 318

[56] References Cited

UNITED STATES PATENTS

| | | | |
|---|---|---|---|
| 3,519,738 | 7/1970 | Morita | 360/70 |
| 3,542,950 | 11/1970 | Luther | 360/70 |
| 3,577,056 | 5/1971 | Tsujikawa | 318/314 |
| 3,611,096 | 10/1971 | Sadashige | 318/314 |
| 3,643,036 | 2/1972 | Takashima | 360/75 |
| 3,651,276 | 3/1972 | Clark | 360/70 |

*Primary Examiner*—Daryl W. Cook
*Assistant Examiner*—Alan Faber
*Attorney, Agent, or Firm*—Ernest F. Marmorek

[57] ABSTRACT

A magnetic tape recording apparatus for recording onto and retrieving information from a magnetic tape with a plurality of transducer heads for performing the information recording or retrieving from the tape in a succession of tracks, a head wheel carrying the transducer heads about its circumference and coupling the transducer heads in a predetermined sequence with the magnetic tape, an asynchron motor operable with a rotating field for driving the head wheel, a supply for supplying the motor with energizing current having three phase components, the supply having one component substantially constant in frequency and the other components variable for controlling the speed of the motor.

5 Claims, 1 Drawing Figure

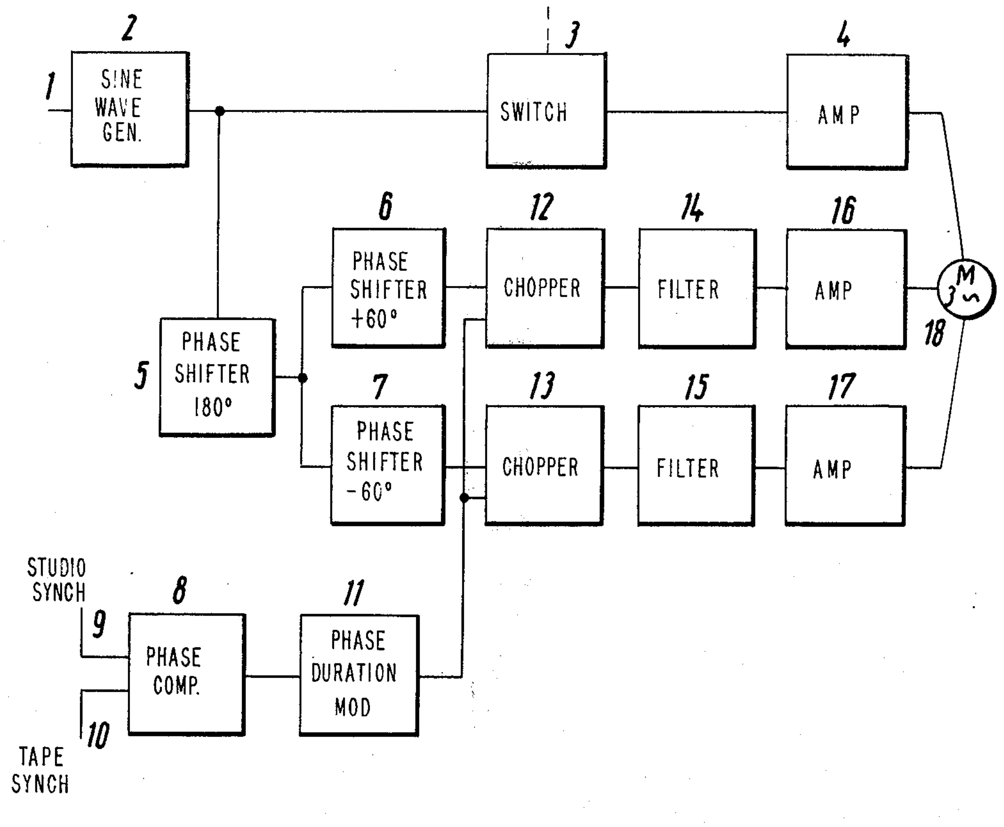
SINE WAVE GEN.
SWITCH
AMP
PHASE SHIFTER +60°
CHOPPER
FILTER
AMP
PHASE SHIFTER 180°
PHASE SHIFTER -60°
CHOPPER
FILTER
AMP
STUDIO SYNCH
PHASE COMP.
PHASE DURATION MOD
TAPE SYNCH
1
2
3
4
5
6
7
8
9
10
11
12
13
14
15
16
17
18

TAPE RECORDING APPARATUS WITH SPEED CONTROL FOR A THREE PHASE HEAD DRIVE MOTOR

FIELD OF THE INVENTION

The present invention relates to a magnetic recording apparatus used for recording information onto or retrieving information from a magnetic tape, including at least one or a plurality of transducer heads which are arranged about the circumference of a head wheel or drum and which scans or reads the magnetic tape in several tracks. The heads follow each other at a certain angle with respect to the direction of movement of the tape. It further includes a rotary field asynchrom motor for driving the head wheel or drum.

BACKGROUND OF THE INVENTION

During the recording or reproduction of information which has a wide band width (as is the case with video signals in the television techniques and wherein the recording or reproduction is performed from or onto a magnetic tape), in order to achieve the largely relative speeds between the electro mechanical transducers and the tape necessary for recording very high frequencies, certain devices are used in which the tape lies against the circumference of a head wheel or drum carrying one or several transducer heads arranged on the circumference of the drum. The tape contains a sequence of tracks as the information and the heads lie against the tape at an oblique angle or substantially transversely with respect to the direction of movement of the tape.

For example, a method became known in this respect, according to which television information is recorded on a tape having a width of about 50mm. The tape lies against approximately one fourth of the circumference of a head wheel which carries four transducer heads. Each transducer head, when it comes into contact with the magnetic tape, will record a portion of the content of the television picture and disengages the tape only after the next transducer head establishes contact with the tape. The drive motor which runs at about 15,000 r.p.m. and drives the head wheel at the same speed, is synchronized in such a manner during recording by the synchron component of the composite signal, that always a certain predetermined component of the video signal or television picture becomes recorded by each head during the contact of the tape by the head.

The synchronization of the driving motor with the input signal, that is, the phase-locked coupling of the motor with the reference frequency, usually cannot be made accurately and there is always a very slight deviation in the regulation present. As a result of this deviation or error in the regulation, the spacing of the pulses representing the line frequency which is recorded simultaneously with the picture content at the beginning of each line, is not exactly equal. As a result, when the information is reproduced from the tape, and although an attempt is made so that the transducer heads of the reproduction apparatus are in strong time relation with the reproducing head of the recording apparatus, there are still disturbances in the picture contents.

In order to avoid the above difficulties it has been proposed that during the reproduction of the information from a magnetic tape which has been recorded, as discussed above, the same type of apparatus be used for the recording and for the reproduction. In order to arrive at the proper synchronization between the line-frequency pulses and the transducer heads, the head wheel motor becomes synchronized by a so-called studio synchronizing signal and a horizontal synchronizing pulse representing the line-frequency which has been previously recorded on the tape. Due to the short time period of the intervals between two H-pulses (the horizontal synchron pulses), it is necessary that the time constant of the regulating path be very small and that the regulation should have such steep characteristics that even in the case of non-uniform sequence or train of the pulses, that is, in the event there is a variably large time distance between the H-pulses which are present in the input signal, the head wheel motor must still be locked in phase onto such pulses. In other words, the head wheel motor during each of its partial rotations, which partial rotation means the period required for recording a line of the television picture, must be capable of being regulated in its instantaneous angular velocity. Otherwise, it may happen that the phase errors or deviation which may occur during the recording and reproduction between the motor and the reference signal will be added and cannot be compensated for or corrected by the subsequently operating electronic time error compensating circuits; since the total error, which also appears as an error on the time scale, will reflect itself as disturbances in the reproduced picture. It is noted there that the regulating path should be understood to mean the entire servo-arrangement of the head wheel motor beginning from the input of the error signal and its feed to the motor, inclusive of the pulses which are retrieved from the head wheel for feedback purposes. The requirement that the time constant of the regulating path must be small means that the regulating deviations or errors should undergo a correction without any substantial time delay so that the coupling of the head wheel motor onto the synchronizing signals be performed in the best possible phase-locked condition.

In the event that there are deviations of the phase position of the motor from the desired phase position, the change in the error signal will bring about an increase in the voltage of each phase so that the resulting excess in the angular momentum will accelerate the rotor and the head wheel which is coupled thereto. The magnitude of such acceleration can be predetermined by appropriately dimensioning the elements of the regulating path and also by, for example, changing the gain of the amplification. As a result, such acceleration can be adjusted to the actual operating conditions. In the event the phase deviation of the driving motor is such that it is then in advance of the desirable phase position, then according to the magnitude and/or the sign of the error signal the amplitude of the feed voltage becomes lowered. Even when such value is close to zero, mechanical conditions may be instantaneously present which would require a very large time period until the detected phase deviation could be compensated. As a result, during the recording there will be a continuous deviation in the regulation about the desired value of the phase position due to the insufficient coupling of the head wheel onto the input signal. The frequency of such phase deviation or error depends also on the friction conditions and the mass relationship of the parts which move together with the head wheel. As a result, the synchron components of the composite television signal are recorded in alternately different intervals or distances.

During the reproduction of earlier tape recordings in which the above-noted defects have frequently been present, the insufficient coupling of the head wheel onto the non-uniformly recorded synchronizing pulses will cause such a large phase error that the subsequently coupled electronic time error correcting circuit will not be able to compensate the resulting error due to the magnitude of this error.

According to an earlier proposition of the assignee of the present application, in German Pat. No. 1,170,451 dated Dec. 23, 1964, the head wheel motor should be supplied through an eddy-current brake with a basic load and with an additional load which is the function of the error signal as alternately excites the eddy-current brake. Such an arrangement requires a complicated structure and circuit and, at the same time, does not possess the required high efficiency. In order to attain a quick regulation of the phase errors when, for instance, there is an advance of the head wheel, the eddy-current brake must be constructed very large and thus make the entire device very heavy. Consequently, the mass of the parts which undergo rotation becomes very large. Such a device has been used in connection with synchron motors which had pressed out poles and which, due to their structure are capable of locking themselves into phase with the frequency of the supply voltage, From German DAS 1,259,932 it became known that a three phase motor, employed in a magnetic tape recording apparatus, can be supplied with a d.c. voltage for breaking with an eddy-current brake. The attainable breaking effect is, however, only of such magnitude that the known arrangement can be used only to phase-lock the tape drive motor, the driving accuracy of which does not have to be within very narrow limits.

Furthermore, from German DAS 1,249,985 belonging to the field of general drive technique, it became known that unsymmetrical phases can be employed to control the angular momentum of asynchron motors.

It became known, furthermore, from German DAS 1,273,058 and German OLS (laid-open application) 1,613,505 that the number of revolutions of asynchron motors below synchronism can be controlled by controlling two of the three phases and the third phase remains uncontrolled as a supply or return conductor. The last-mentioned propositions are, however, not employed in connection with magnetic tape recording apparatus.

SUMMARY OF THE INVENTION

It is, therefore, an object of the present invention to provide an improved magnetic tape recording and replaying apparatus, the regulating arrangement for the head wheel motor of which possesses a very high regulating quality or regulating factor without enlarging the space and circuit outlay with respect to the above-discussed prior art circuits.

The invention provides accordingly a magnetic tape recording apparatus for recording onto and retrieving information from a magnetic tape means comprising a plurality of transducer heads for performing the information recording or retrieving from the tape means in a succession of tracks, a head wheel means carrying the transducer heads about its circumference and coupling the transducer heads in a predetermined sequence with the magnetic tape means, an asynchron motor operable with a rotating field for driving the head wheel and means for supplying the motor with energizing current having a three phase character, the supply means having an unsymmetrical structure.

Preferably in the driving of the head wheel motor asynchron motors operating with a rotating field are used which have the advantage over synchron motors in that they possess a much larger uniformity and smoothness in their operation. In one of the known magnetic tape recording apparatus, the apparatus employs a hysteresis motor because of the very desirable angular momentum characteristics of this motor and because it is driven at a revolution corresponding to about half of that of its rotating field.

Under such operating conditions the largest possible and angular momentum will be developed which is very desirable and has a very beneficial effect in obtaining a short start-up run and a steep regulating characteristic. The required three-phase voltage having a substantially stationary frequency is created by obtaining two of its phases by rotating the phase of the original sinusoidal wave by 180° and by a subsequent splitting and a further phase rotation by about plus or minus 60°. All three phases are subsequently fed into a chopper circuit in which the pulse width is determined by an error signal which is obtained as a result of the phase comparison between the pulses coming from the tach-generator of the head wheel and a train of reference pulses. The signal obtained in the above-manner is fed in each phase to a power amplifier in which the amplitude of the output signal in each of the three phases is proportional to the magnitude of the error signal.

BRIEF DESCRIPTION OF THE DRAWING

The invention will become more readily apparent from the following description of a preferred embodiment thereof shown, by way of example, in the accompanying drawing, in which:

The single FIGURE is a schematic representation of the regulating circuit for the head wheel drive of a videotape recording and replaying apparatus.

DESCRIPTION OF THE PREFERRED EMBODIMENT

With reference to the single FIGURE it is seen that at the input 1 a signal having substantially fixed frequency generated by head-wheel-tacho is fed into a circuit element 2 which transforms such signal into a sinusoidal wave and over a switch 3 which is the turn-on switch of the motor, then is fed to an amplifier 4. It is also fed to a phase-shifting stage 5 where it becomes rotated by 180°. The output of the phase-shifting stage 5 is a signal which is fed into stage 6 where it becomes advanced by 60° and in the stage 7 it is given a 60° lagging. A phase comprator circuit 8 is fed at its input 9 with a studio synchronizing component of the video signal during recording, while during reproduction at such input the line-frequency pulses are fed which have been retrieved from the tape during the scanning of the recorded information. Depending on the results of the phase comparison in the comparing stage 8, a modulation stage 11 will produce an error signal having a varying pulse width which is then fed to the two chopper circuits 12 and 13. With respect to the operation of the modulation stage 11 it is noted that it operates depending from the output of the comparator stage 8 and depending from the error signal coming therefrom, it will produce a pulse train the width or period of the pulses of which depend from the instantaneous value of the error signal voltage. Such a type of modulation is known as pulse duration modulation (PDM) and it is assumed as being well-known for experts in the electronics art. For clarity, however, reference is had to page 161, of the periodical "Leitfaden der Elektrotechnik, " Vol. VI, part 2, 1967, by Verlag B. G. Teubner, Stuttgart, W. Germany, describing such pulse duration modulation. The signals leaving the phaseshifting stages 6 and 7 enter the chopper stages 12 and 13 where they are chopped into partial components following each other in succession on the time scale. The width of the pulses leaving the output of the modulation stage 11 is controlled by means as above discussed in connection with the operation of the modulation stage 11. Stages 14 and 15 are filter stages which filter out the base frequency and feed their output to the amplifiers 16 and 17.

During operation of the circuit arrangement depicted in the single FIGURE, for example, as during reproduction and beyond the initial run-up period, the output of the amplifiers 16 and 17 will deliver controlled voltages having a magnitude, for example, $130V_{ss}$ . At the output of the amplifier 4 there will be a constant voltage present, for example, of the magnitude $350V_{ss}$. Due to the unsymmetrical phase conditions herein which follow from the above, the rotor of the asynchron motor 18 will receive a controlled braking momentum. In the event the head wheel is leading, then the phase comparator circuits 8–10 of the overall circuit illustrated will produce in stage 8, and in the subsequently coupled modulation stage 11, pulses having a smaller width which, in the amplifiers 16 and 17, will cause a reduction of the output voltages. It is noted that the width of the pulses at the putput of the modulation stage 11 depends directly from the magnitude of the error voltage at the input of such stage 11. In the event there is an average lagging of the head wheel motor with respect to the horizontal synchron pulses, then the modulation stage 11 will produce pulses having an average width which, accordingly, will be amplified, and such voltages will be put into both controlled phase branches after finally arriving at stages 16 and 17, and which will be capable of compensating for the frictional loses in the head wheel arrangement. In the event, however, that an abnormality develops, for example, due to a phase skipping in the sequence of the horizontal synchron signals, then according to the present invention, the head wheel must in the shortest possible time, follow-up the changed phase of the synchron signals by assuming the previously indicated phase position. Assuming that the phase jumps of the horizontal synchron signal have the effect that the head wheel is leading or advancing with respect to the normal phase position thereof, then the phase comparing circuit 8 will conclude, due to its functional arrangement, that between the reference synchron signal, such as a studio synchron signal and the line-frequency pulses which are obtained during the scanning of the information from the tape, there is a phase relation which has the character of advancing or leading. The error voltage which appears then at the output of the phase comparing circuit or stage 8, must then be small, as a result, the period of the pulses at the output of the modulation stage 11 will become relatively slight or narrow. Now, together with the unregulated third phase which is represented as stage 4, a strong unsymmetrical condition will be present in the rotating field of the head wheel motor M which, as the result of such unsymmetrical condition in the supply phases, will undergo a strong braking until the original phase relationship becomes re-established. Of course, the regulated phases together with the unregulated phase produce a rotating field in the motor 18 which has either a larger or smaller mean value depending on the direction of regulation.

It is noted that the unregulated voltage represented by the amplifier 4 remains at its full magnitude and if the unsymmetrical phase condition becomes larger, it results in a very effective braking momentum exerted on the motor in the form of a phase-locked coupling.

On the other hand, in the event there is a lagging of the head wheel with respect to the reference synchron signal and which might be caused by increased friction of the magnetic heads on the tape, then such lagging will cause an increase in the phase difference. As a result, the phase comparing circuit or stage 8 will produce an error signal having a large amplitude and the modulation stage 11 will produce consequently pulses having large periods, that is, broader width. As a result a rotating field is produced onto the motor M in which the unregulated phase represented at the output of amplifier stage 4 and the two regulated phase voltages at the outputs amplifiers 16 and 17 will have voltages of such magnitude present in them that the head wheel motor under such circumstances will be fed by a symmetrical rotating field, but having an excess or overdrive effect which causes a strong acceleration of the rotor 18 and of the head wheel coupled thereto which will compensate the causing defect, that is, the lagging of the head wheel.

It is noted that simultaneously the imbalance of the rotating field fed to the motor 18 becomes slighter and slighter due to the conditions existing again at the inputs 9 and 10 of the comparing stage 8 and, therefore, the braking effect exerted on the rotor of the motor 18 will be reduced and very quickly disappear, as soon as the causing condition has been corrected. As a result, the head wheel coupled to the rotor of the motor 18 is in the position to quickly compensate any phase variations. As can be seen in the single FIGURE, the circuit arrangement is extremely simple and is still capable of producing a strong phase-lock coupling of the motor 18 onto the instantaneous reference signal arriving at the inputs 9 and 10 on the comparing circuit 8 and at the input 1. It follows from the above description that the invention provides an arrangement which enables the use of an asynchron drive for the head wheel of a video tape recording and replaying arrangement.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a magnetic tape recording apparatus for recording onto and retrieving information from a magnetic tape, comprising a plurality of transducer heads operable for recording onto and retrieving the information from the magnetic tape in a succession of tracks defined on the magnetic tape, a circular head wheel means having a circumference and connected to said transducer head at its cimcumference and operable for coupling said transducer heads to said magnetic tape in a predetermined sequence, and a three phase motor having a rotating field generated therein from a three phase signal in driving connection with said head wheel means, said three phase signal having three components wherein the improvement comprises;

first voltage supply means coupled to said motor and operable for supplying one of said component voltages at a substantially constant given voltage amplitude and a substantially constant given frequency;

error signal means operable for producing an error signal for controlling said motor;

second voltage supply means coupled to said motor and controlled by said error signal means and operable for supplying the other two component voltages each of which has a lower voltage amplitude than said one component voltage and being at said frequency; and voltage adjusting means coupled to said second voltage supply means and said error signal means and operable for changing the amplitudes of said other component voltages in response to said error signal, whereby the rotating field is changed in response to said error signal so that the rate of rotation of the motor is changed accordingly.

2. The apparatus as claimed in claim 1, wherein said magnetic tape has reference pulse information stored therein and one of said transducer heads is operable for retrieving said reference pulse information in the form of a reference signal and further comprising coupling means for coupling said reference signal to said error signal means and operable for supplying a reference synchronizing signal.

3. The apparatus as claimed in claim 2, wherein said first voltage supply means comprises a tachometer generator operable for producing a signal correlated to the rate of rotation of said head wheel means and said second voltage supply means is coupled to said tachometer generator and is operable for producing said other components from said tachometer generator signal.

4. The apparatus as claimed in claim 3, wherein said second voltage supply means comprises first phase shifting means operable for supplying a first signal 180° shifted from said tachometer generator signal, second phase shifting means coupled to said first phase shifting means and operable for producing a second signal phase shifted 60° ahead of said first signal, third phase shifting means coupled to said first phase shifted 60° behind said first signal, first processing means for coupling said second phase shifting means to said motor and operable for producing one of said other components, second processing means coupling said third phase shifting means to said motor and operable for producing the other of said other components, and second coupling means for coupling said error voltage means to said first and said second processing means.

5. The apparatus as claimed in claim 4, wherein said error signal means comprises a pulse duration modulation means operable for producing a pulse signal having a pulse duration depending upon the magnitude of difference between the frequency of said synchronizing signal and said reference signal.

* * * * *